(12) United States Patent
Abdel Shahid et al.

(10) Patent No.: US 11,224,057 B2
(45) Date of Patent: Jan. 11, 2022

(54) UPLINK TIME DIVISION MULTIPLEXING PATTERN FOR 5G NON-STANDALONE DEVICES

(71) Applicant: T-Mobile USA, Inc., Bellevue, WA (US)

(72) Inventors: Wafik Abdel Shahid, Kenmore, WA (US); Thomas P. Lucht, Seattle, WA (US); Yasmin Karimli, Kirkland, WA (US); Ming Shan Kwok, Seattle, WA (US)

(73) Assignee: T-Mobile USA, Inc., Bellevue, WA (US)

(*) Notice: Subject to any disclaimer, the term of this patent is extended or adjusted under 35 U.S.C. 154(b) by 0 days.

(21) Appl. No.: 16/585,464

(22) Filed: Sep. 27, 2019

(65) Prior Publication Data

US 2020/0120695 A1 Apr. 16, 2020

Related U.S. Application Data (60) Provisional application No. 62/745,182, filed on Oct. 12, 2018.

(51) Int. Cl.
*H04W 72/12* (2009.01)
*H04W 74/08* (2009.01)
*H04W 72/04* (2009.01)

(52) U.S. Cl.
CPC ... *H04W 72/1268* (2013.01); *H04W 72/0446* (2013.01); *H04W 74/0808* (2013.01)

(58) Field of Classification Search
CPC ......... H04W 72/1268; H04W 72/0446; H04W 74/0808

USPC .......................................................... 370/329
See application file for complete search history.

(56) References Cited

U.S. PATENT DOCUMENTS

| 2014/0187287 | A1 | 7/2014 | Medapalli |
| 2018/0132200 | A1 | 5/2018 | Gheorghiu et al. |
| 2018/0368199 | A1* | 12/2018 | Zeng ................ H04W 88/10 |
| 2020/0205156 | A1* | 6/2020 | Adjakple .......... H04W 74/0833 |

OTHER PUBLICATIONS

Apple Inc, "NR TDD Configurations with Cyclic Shift for LTE-NR Co-existence", R1-1808614, #GPP TSG-RAN WG1 Meeting 394, Gothenburg Sweden, Aug. 11, 2018, 4 pages.
Intel Corporation, "Remaining Issues of NR-LTE co-existence" R1-1808675, 3GPP TSG-RAN WG1, Meeting #94, Gothenburg, Sweden, Aug. 11, 2018, 4 pages.
Motorola Mobility et al, "Maintenace for NR-LTE coexistence", R1-1809397, 3GPP TSG0R-RAB WG1, Meeting #92, Gothenburg, Sweden, Aug. 11, 2018m 4 pages.
The PCT Search Report and Written Opinion dated Jan. 15, 2020 for PCT Application No. PCT/US2019/053732, 9 pages.

* cited by examiner

*Primary Examiner* — Yemane Mesfin
*Assistant Examiner* — Intekhaab A Siddiquee
(74) *Attorney, Agent, or Firm* — Lee & Hayes, P.C.

(57) ABSTRACT

Systems and methods discussed herein are directed to allocating subframes (or slots) of radio frames for LTE uplink transmissions and NR uplink transmissions. In some instances, subframes (or slots) of radio frames may be allocated for LTE downlink transmissions and NR downlink transmissions.

20 Claims, 6 Drawing Sheets

MSD / DC bandwidth class B

| DC configuration | E-UTRA/NR band | Fc (UL) (MHz) | Channel bandwidth (MHz) | UL allocation (LCRB) | Fc (DL) (MHz) | MSD (dB) | Duplex mode |
|---|---|---|---|---|---|---|---|
| DC_(n)71B | 71 | 665.5 | 5 | 5 (RB_start =24) | 619.5 | 0 | FDD |
| DC_(n)71B | n71 | 675.5 | 15 | 15 (RB_start =0) | 620.5 | 1.8 | |
| DC_(n)71B | 71 | 670.5 | 15 | 15 (RB_start =74) | 624.5 | 0 | |
| DC_(n)71B | n71 | 680.5 | 5 | 5 (RB_start =0) | 634.5 | 1.6 | |
| DC_(n)71B | 71 | 668 | 10 | 10 (RB_start =49) | 622 | 0 | |
| DC_(n)71B | n71 | 678 | 10 | 10 (RB_start =0) | 632 | 1.7 | |
| DC_(n)71B | 71 | 668 | 10 | 10 (RB_start =0) | 622 | 17.2 | |
| DC_(n)71B | n71 | 678 | 10 | 10 (RB_start =51) | 632 | 29.4 | |

600

UPLINK TIME DIVISION MULTIPLEXING PATTERN FOR 5G NON-STANDALONE DEVICES

CROSS REFERENCE TO RELATED APPLICATIONS

The present disclosure is a nonprovisional application of and claims priority to U.S. Provisional Patent Application No. 62/745,182, filed Oct. 12, 2018, which is incorporated herein by reference.

BACKGROUND

Electronic devices are increasingly able to communicate with other entities, e.g., other electronic devices. Many of these devices are referred to as "connected devices," such as, for example, devices configured as Internet of things (IoT) devices, machine-to-machine (M2M) devices, etc. Such devices, as well as mobile communication devices, such as, for example, smart phones, portable computers, notebooks, laptops, etc., and other types of computing devices, both mobile and stationary, often communicate with other entities, e.g., servers, other similar devices, etc., over the Internet via wireless communication networks.

Wireless communication networks continue to evolve to provide better quality of service and user experience as the number of electronic devices operating within wireless communication networks increases. Thus, there are various operating protocols and operating standards that have been developed, and continue to be developed, for wireless communication networks. For example, there are standards related to third generation (3G), Long Term Evolution (LTE), fourth generation (4G), and fifth generation (5G) operating protocols. Often, electronic devices may be configured as non-standalone devices so that they may operate using different operating protocols within wireless communication networks. For example, an electronic device may be capable of operating according to 3G operating protocols, LTE operating protocols, 4G operating protocols, 5G operating protocols, as well as other operating protocols. Many of the operating protocols have been developed and/or adopted by the Third Generation Partnership Project (3GPP).

As the newest 5G operating protocols (new radio (NR)) are implemented, devices that are capable of operating within wireless communication networks according to 5G operating protocols are being used by people. Such wireless communication devices are generally capable of operating according to both LTE operating protocols and NR operating protocols, as well as other operating protocols. However, since the NR operating protocols are being implemented, cells within wireless communication networks may not be able to provide dedicated coverage for NR operating protocols. For example, a cell may only provide service for wireless communication devices within the low band, e.g., 600 megahertz (MHz). Simultaneous uplink for LTE and NR transmissions, as well as the downlink transmission, may provide a better user experience. Thus, if the opportunity is available to pair LTE and NR transmission using the mid-band transmission of the wireless communication network for LTE as the anchor and then using the low band, 600 MHz NR link for data, simultaneous uplink transmission may be enabled.

Unfortunately, the mid-band frequency propagation of coverage in cells of wireless communication networks may be much smaller than the low band frequency propagation of coverage in the wireless communication network. Thus, there may be a certain point where the mid-band frequency coverage may be totally lost. The remaining coverage within the communication network may only be the low band, e.g., 600 MHz frequency. This may result in "collision" between LTE and NR on uplink transmissions when the coverage in the wireless communication network cell is only 600 MHz. This generally results in a high amount of performance degradation.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Techniques and architecture are described herein for dividing up radio subframes of radio frames in a wireless communication network for uplink and downlink transmissions, and in particular, for dividing radio subframes of radio frames for uplink transmissions, where the division is between Long Term Evolution (LTE) and New Radio (NR), e.g., 5G radio. In particular, the configurations relate to the DC_(n)71B "LTE+NR," the $3^{rd}$ Generation Partnership Project (3GPP) destination for dual connectivity of 600 megahertz (MHz) of LTE with 600 MHz of NR operating together. The techniques provided relate to introducing Time Division Multiplexing (TDM) between evolved NodeB (eNB) and next generation nodeB (gNB) by utilizing the "SGNB Addition Request" procedure introduced in the 3GPP.

With the DC_(n)71B "LTE+NR" protocol, high "Max Sensitivity Degradation" (MSD) on the User Equipment (UE) Receive path may be as high as ~30 dB for NR and ~18 dB for LTE with specific Dual Connectivity carriers Bandwidth (BW) and Physical Resource Block (PRB) allocations. Furthermore, "Additional Max Power Reduction" (A-MPR) may be required during Simultaneous Uplink Transmission to meet FCC out of band emission requirements. Also, the coverage of the NR footprint may not be equal to LTE due to "Dynamic Power Sharing" (DPS) algorithms insuring LTE Transmission Power is always prioritized over NR Transmission Power for the appropriate reasons as per 3GPP specifications.

Thus, in configurations, Time Division Multiplexing (TDM) pattern is introduced between eNB and gNB by utilizing the SGNB Addition Request procedure introduced in the 3GPP spec 36.423 Rel 15. The procedure allows for resource coordination between eNB and gNB nodes of a cell using a bit-string to inform the gNB node of resources intended to be used by the eNB node so that the gNB node will refrain from using those resources. Resource coordination is per subframe (or slot for NR) of a radio frame or 1 ms Time Transmission Interval (TTI) and it may point to specific PRBs within a subframe. The procedure also allows for different resource coordination for Uplink (UL) and Downlink (DL) to be communicated by the eNB node to the gNB node. By allocating different UL subframes to be used by the eNB node on UL while remaining subframes in a given radio frame can be used by the gNB node, a TDM pattern on the UL is introduced, thereby avoiding situations where the UE may be required to transmit simultaneously on LTE and NR in the same TTI.

Simultaneous UL may provide a better user experience because there is no limitation on the UL transmission as well as the DL transmission. Thus, if the opportunity is available to pair using the mid band transmission, e.g., approximately 1.7 Gigahertz (GHz) to 1.8 GHz, of a communication network for LTE as the anchor, and then using the low band, 600 MHz 5G as the NR link for data, the simultaneous UL transmission may be enabled. Unfortunately, the mid band frequency propagation of coverage in cells of a wireless communication network may be much smaller than the low band frequency propagation of coverage in the wireless communication network so there may be a certain point where the mid band frequency coverage may be totally lost and then the remaining coverage within the communication network may be the low band, 600 MHz frequency. Thus, dividing up radio subframes (or slots) of a radio frame for UL transmissions may protect the implementation of the user experience when low band is all that is available for coverage within the wireless communication network.

In configurations, when a UE in the wireless communication network approaches a cell edge, the UE may be handed over to an adjacent cell to maintain service and user experience. However, there may be situations where only a single cell is available and the UE is at the cell edge of that cell and there are no other adjacent cells available. For such a situation, in order to address the user experience and maintain service for the user of the UE, when the UE is at the cell edge, for LTE there will be more retransmission occurring. The retransmission is because the UL power may be totally used up and thus, UL transmissions may not be able to reach the cell site, e.g., the base station or access point. Retransmission is used in order to ensure the UL information is received well at the base station. Thus, capacity on the UL may be spared in order to protect the user experience. In fact, more capacity on the UL may need to be spared to address the retransmission scenario. Accordingly, in configurations, radio subframes (or slots) of a radio frame may be divided for DL transmissions, where the division is between LTE and NR. This means less DL traffic, which may mean fewer UL transmissions and then there may be more spare capacity on the UL for retransmission.

Figure 1:
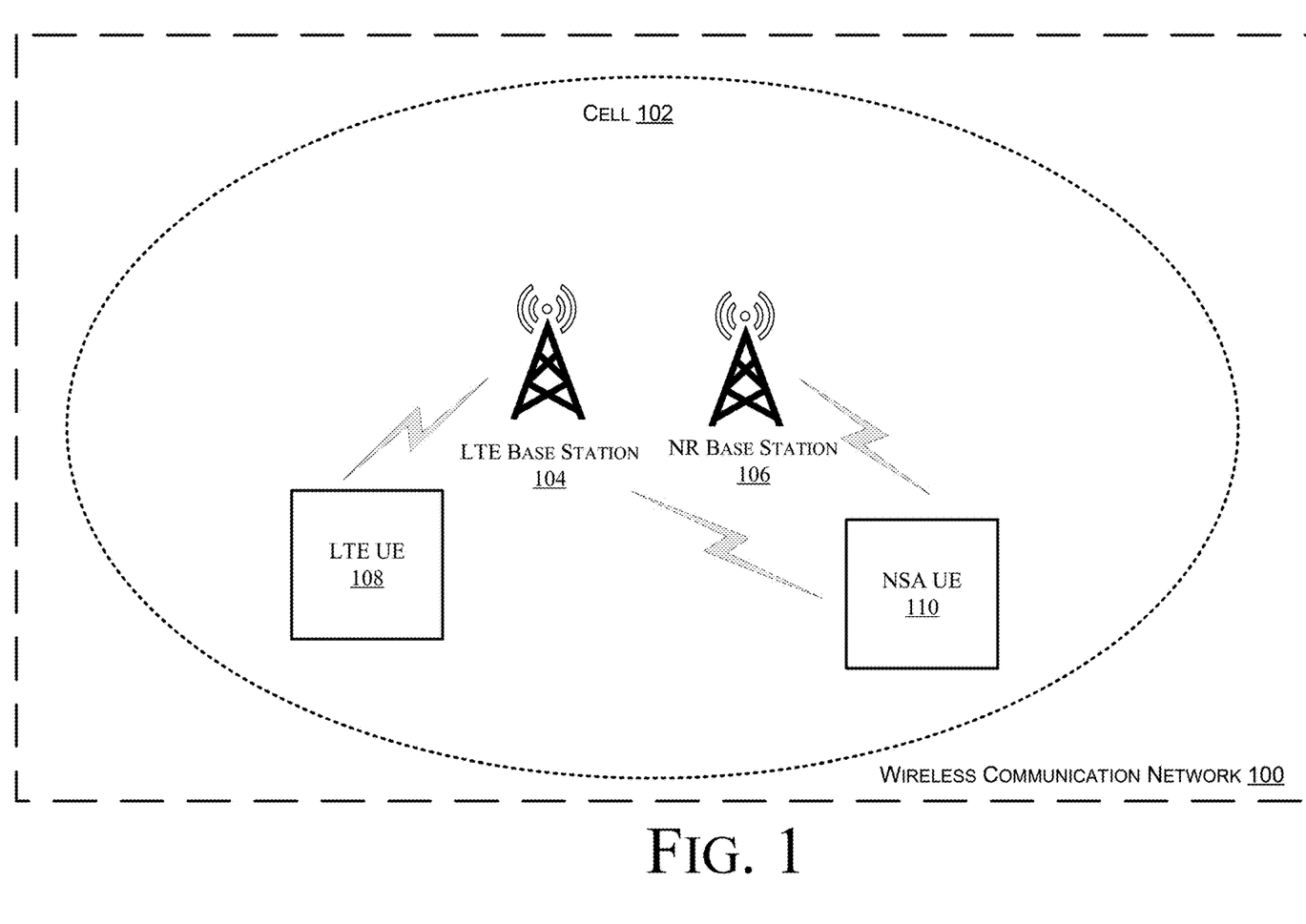
FIG. 1 schematically illustrates a cell of a wireless communication network, in accordance with various configurations.

FIG. 1 schematically illustrates a cell 102 of a wireless communication network 100. The cell 102 generally represents one of many cells within the wireless communication network 100. However, only a single cell 102 is depicted in FIG. 1 for clarity.

The cell 102 includes a LTE base station 104 and a NR base station 106. In configurations, the LTE base station 104 and the NR base station 106 may be co-located in a single base station, e.g., on a single tower. A first UE 108 is illustrated. The first UE 108 is configured according to LTE operating protocols. The first UE 108 may not be configured to operate according to NR operating protocols, but may be configured to operate according to other operating protocols, e.g., Global System for Mobile Communications (GSM), Time Division Multiple Access (TDMA), Universal Mobile Telecommunications System (UMTS), Evolution-Data Optimized (EVDO), Long Term Evolution (LTE), Advanced LTE (LTE+), Generic Access Network (GAN), Unlicensed Mobile Access (UMA), Code Division Multiple Access (CDMA), Orthogonal Frequency Division Multiple Access (OFDM), General Packet Radio Service (GPRS), Enhanced Data GSM Environment (EDGE), Advanced Mobile Phone System (AMPS), High Speed Packet Access (HSPA), evolved HSPA (HSPA+), Voice over IP (VoIP), Voice over LTE (VoLTE), IEEE 802.1x protocols, WiMAX, Wi-Fi, and/or any future IP-based network technology or evolution of an existing IP-based network technology, and/or the like.

A second UE 110 is illustrated that is configured to operate within the wireless communication network 100 according to 5G operating protocols. The second UE 110 is also configured to operate according to LTE operating protocols and may be configured to operate according to other operating protocols as listed for UE 108. Thus, the second UE 110 is often referred to as a non-standalone (NSA) wireless communication device. Generally, there are many wireless communication devices operating within the various cells of the wireless communication network 100. However, only the first and second UEs 108 and 110 are illustrated for clarity purposes.

The UEs 108 and 110 may be implemented as any suitable device that may be configured as a "connected device," e.g., an Internet of things (IoT) device, a machine-to-machine (M2M) device, etc. The UEs 108 and 110 may also be implemented as a mobile computing device configured to communicate over a wireless and/or wireline network, including, without limitation, a mobile phone (e.g., a smart phone), a tablet computer, a laptop computer, a portable digital assistant (PDA), a wearable computer (e.g., electronic/smart glasses, a smart watch, fitness trackers, etc.), a networked digital camera, a motor vehicle, and/or similar mobile devices. Although this description predominantly describes the electronic device 104 as being "mobile" (i.e., configured to be carried and moved around), it is to be appreciated that the electronic device 104 may represent various types of communication devices that are generally stationary as well, such as televisions, appliances, desktop computers, game consoles, set top boxes, and the like. In this sense, the terms "communication device," "wireless device," "wireline device," "mobile device," "computing device," and "user equipment (UE)" may be used interchangeably herein to describe any communication device capable of performing the techniques described herein. Furthermore, the UEs 108 and 110 may be capable of communicating over wired networks, and/or wirelessly using any suitable wireless communications/data technology, protocol, or standard, such as those mentioned above.

When the first UE 108 operates within the cell 102, the first UE 108 interacts with the LTE base station 104 for both calls and data transmission. The second UE 110 may interact with only the NR base station 106, or may interact with both the NR base station 106 and the LTE base station 108. The second UE 110 may also interact only with the LTE base station. As is known, according to 3GPP standards, wireless communication networks and devices may be classified as non-standalone (NSA), which generally means that the 5G networks will be supported by existing LTE infrastructure. Thus, in such scenarios, 5G enabled smart phones and other 5G enabled devices may connect to 5G frequencies for data throughput improvements, but may still use LTE for non-data duties such as talking to the base stations and servers.

Figure 2:
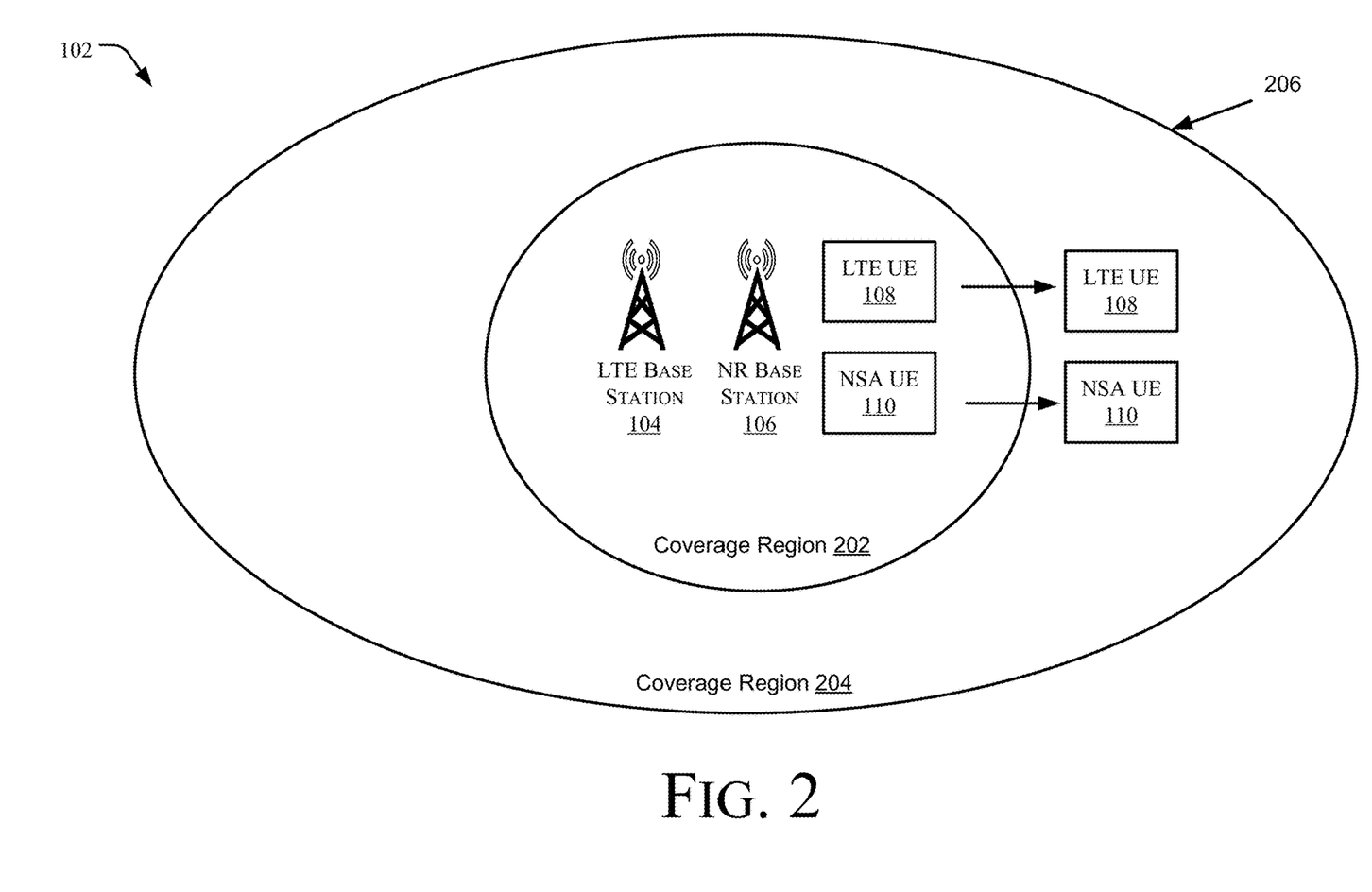
FIG. 2 schematically illustrates coverage regions of the cell 102 of FIG. 1, in accordance with various configurations.

FIG. 2 schematically illustrates coverage regions of the cell 102 of FIG. 1. In a first coverage region 202 of the cell 102, good signal strength is provided in both the mid-band and low band frequencies operating within the cell 102. Thus, the second UE 110 may operate using one or both of the NR base station 106 and/or the LTE base station 104, while the first UE 108 may operate using the LTE base station 104. UL and DL may occur simultaneously.

As the UEs 108 and 110 move away from the first coverage region 202, e.g., the coverage region closest to the two base stations 104 and 106, toward a second coverage area 204 of the cell 102, the mid-band coverage is not as strong, e.g., the signal strength using the mid-band frequency deteriorates. Thus, at this point both the NR base station 106 and the LTE base station 104 may utilize the low band frequency. Thus, both of the UEs 108 and 110 may communicate with one or both of the base stations 104 and 106 utilizing the low band frequency. In accordance with configurations herein, the 3GPP SGNB procedure may be utilized to communicate with the gNB, e.g., the NR base station 106. In configurations, based on a high MSD PRB uplink allocation, five alternating subframes (or slots) for the UL transmission of a radio frame may be reserved in order to introduce time division multiplex on the UL direction only. Thus, the other five subframes (or slots) of the radio frame are reserved for use by the LTE base station for UL transmissions.

Accordingly, the UE 108 may perform LTE UL transmission on every other subframe of radio frames. In configurations, the reserved subframes may be the even numbered subframes, e.g., 0, 2, 4, 6, and 8, for UL transmission to the eNB, e.g., the LTE base station 104. The UE 110 may also perform LTE UL transmission on every other subframe of radio frames, e.g., the even numbered subframes, e.g., 0, 2, 4, 6, and 8, for UL transmission to the eNB, e.g., the LTE base station 104. For the NR uplink transmission, the UE 110 may perform NR UL transmission on every other subframe of radio frames, e.g., the odd numbered subframes, which for NR operating protocols are referred to as slots, e.g., 1, 3, 5, 7, and 9 to the gNB, e.g., the NR base station 106. In configurations, the DL transmissions for both LTE and NR may be simultaneous, e.g., DL transmissions from the LTE base station 104 may occur simultaneously with DL transmissions from the NR base station 106.

Figure 6:
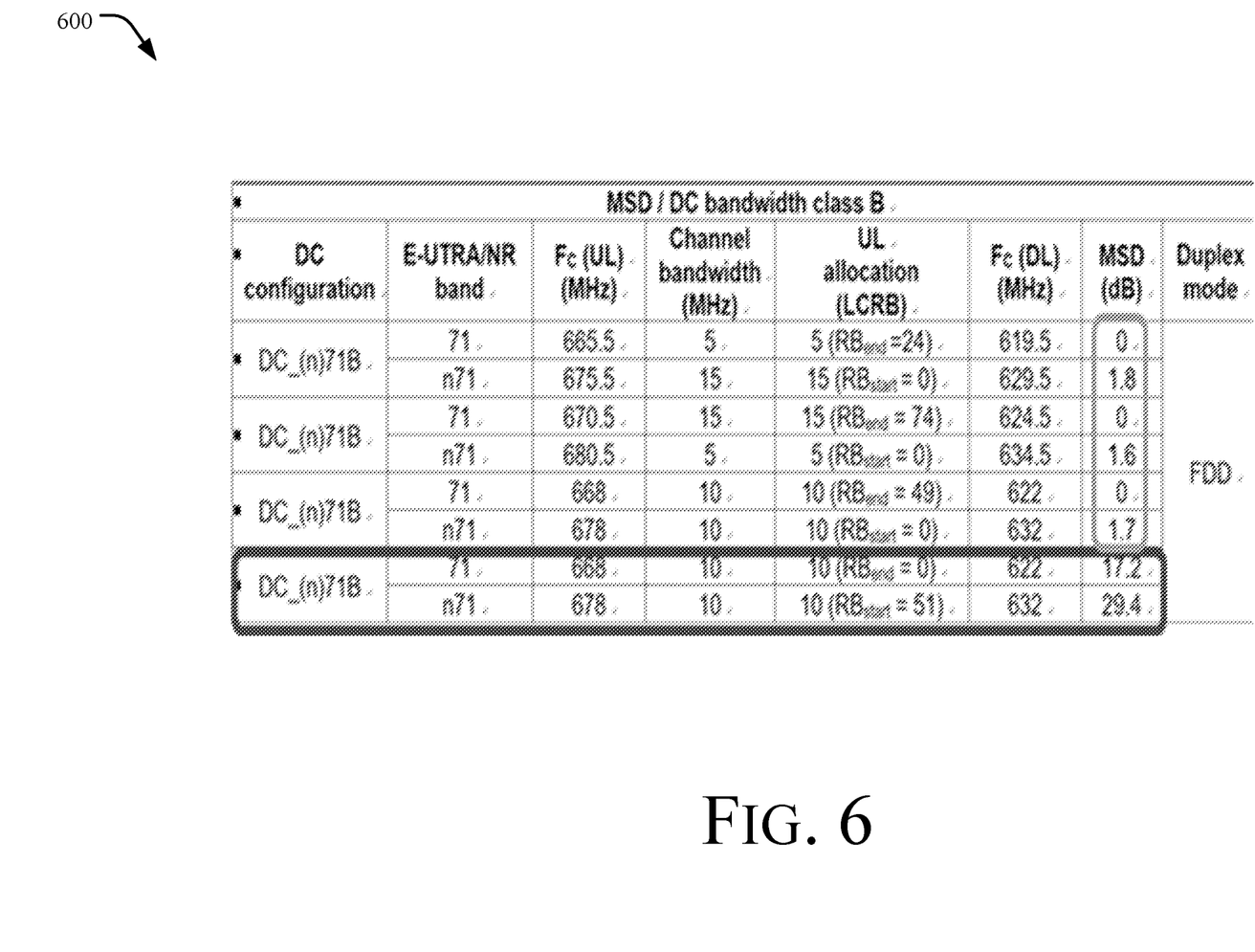
FIG. 6 illustrates a table showing reference sensitivity (MSD) for intra-band direct current (DC) bandwidth class, in accordance with various configurations.

Thus, with reference to Table 600, illustrated with respect to FIG. 6, in configurations, to avoid high MSD, the eNB, e.g., the LTE base station 104, may communicate specific PRB allocations highlighted below to the gNB, e.g., the NR base station 106. This may prohibit the gNB from using the below highlighted PRB allocations.

Based on the UEs 108 and 110 being in a good coverage region, e.g., the first coverage region 202, based on a PHR report, to avoid A-MPR, the eNB, e.g., the LTE base station 104, may communicate usage of the following UL subframes 0, 2, 4, and 6 and by default the gNB, e.g., the NR base station 106, may then be using the following UL subframes 1, 3, 5, 7 and 9. The eNB and gNB may schedule the control channels of the UEs 108 and 110 in the same UL subframes. This subframe subdivision for UL transmissions may thus introduce a TDM pattern in the UL direction.

As can be seen in FIG. 2, as the cell edge 206 is approached by the UEs 108 and 110, the signal strength within the low band may deteriorate such that radio frames for DL transmissions may also be subdivided. In configurations, the radio frames may be subdivided to match the subdivision of radio frames for the UL transmission. For example, DL transmission subframes may be reserved, e.g., the even numbers, for the DL transmissions from the LTE base station 104, while the other subframes or slots may be reserved for DL transmissions from the NR base station 106.

Figure 3:
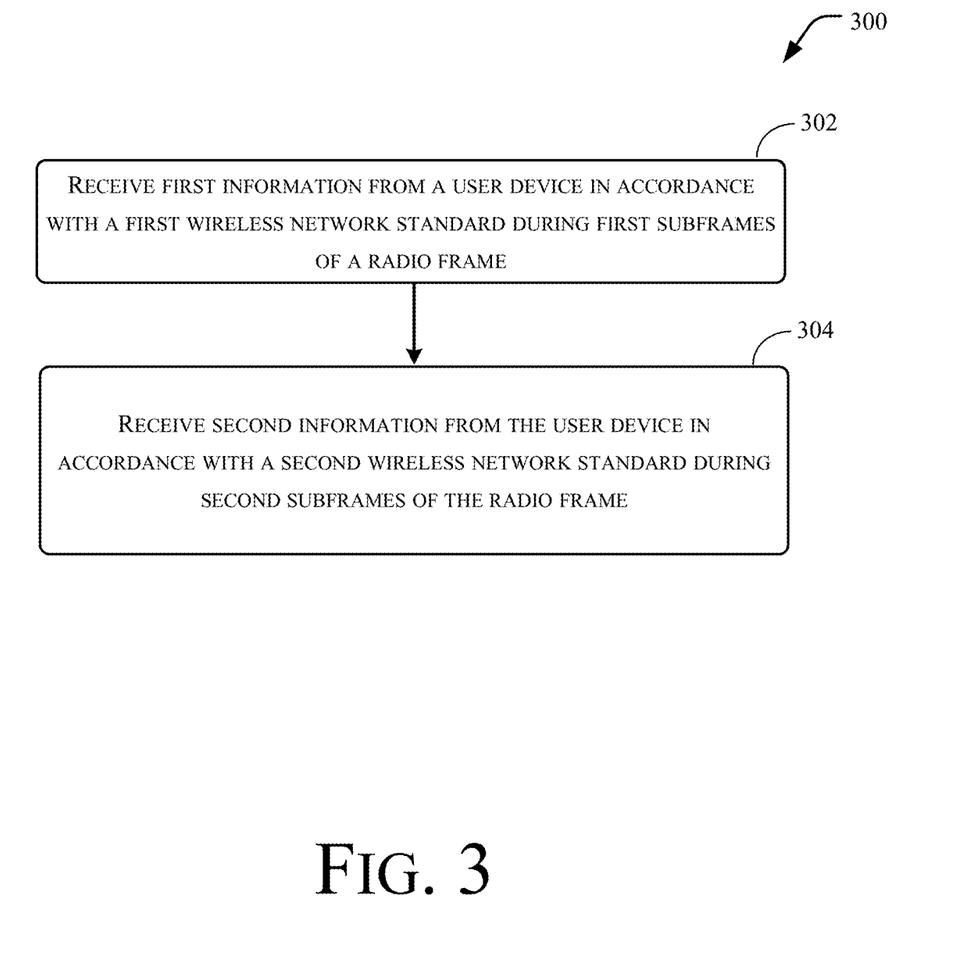
FIG. 3 is a flow diagram of an example process for UL transmitting using different subframes for different operating protocols for the cell of FIGS. 1 and 2, in accordance with various configurations.

FIG. 3 is a flow diagram of an example process 300 for UL transmitting using different subframes for different operating protocols, e.g., LTE and NR, within a cell of a wireless communication network, e.g., cell 102 of the wireless communication network 100. At block 302, first information is received from a user device, e.g., UE 108 or UE 110, in accordance with a first wireless network standard, e.g., LTE. The first information is received at a first node, e.g., the LTE base station 104, during first subframes of a radio frame. At block 304, second information is received from the user device in accordance with a second wireless network standard, e.g., NR. The second information is received at a second node, e.g., the NR base station, during second subframes of the radio frame. The second subframes and the first subframes represent non-overlapping subframes in time.

Figure 4:
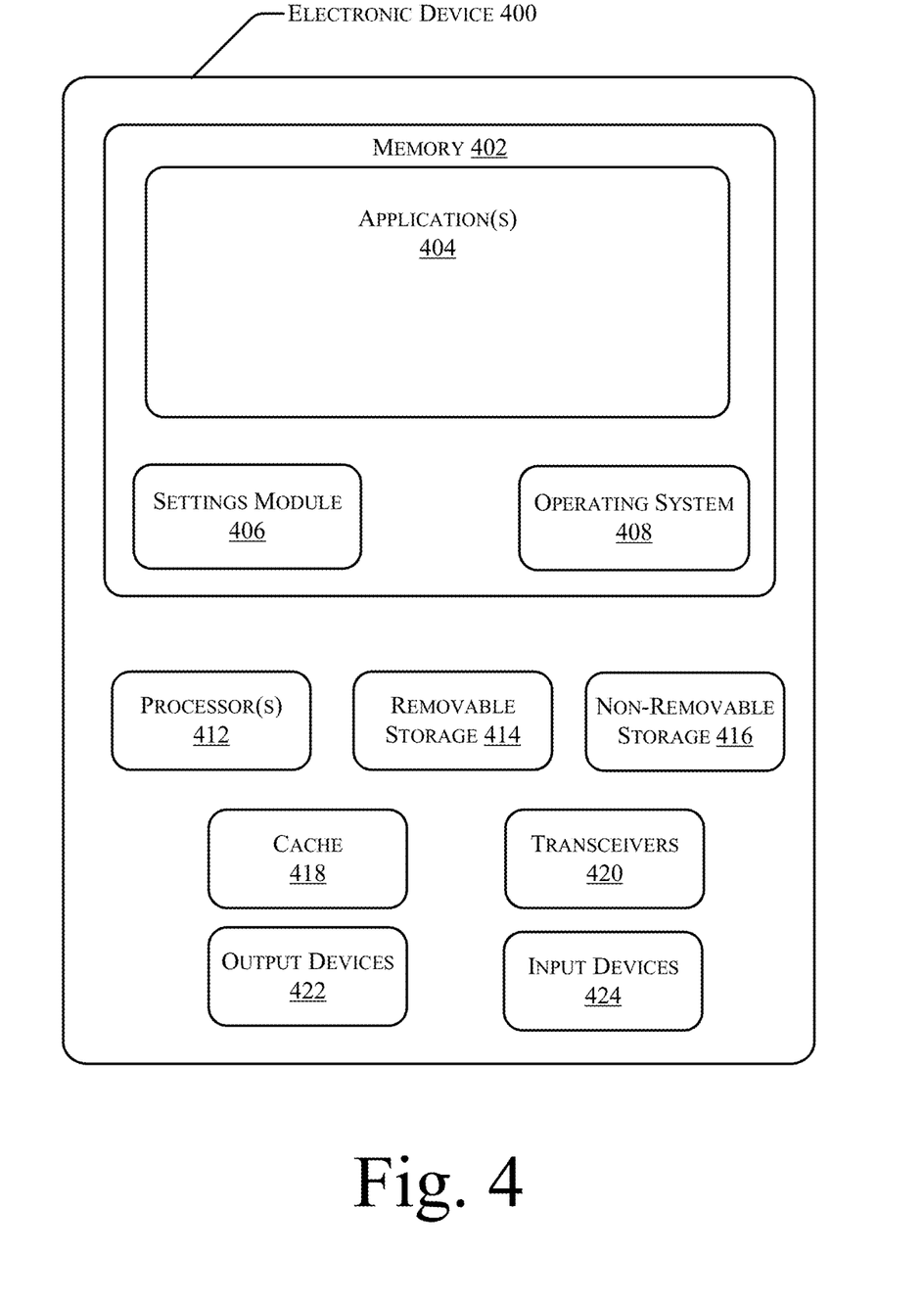
FIG. 4 schematically illustrates a component level view of an example electronic device configured for use in the wireless communication network of FIG. 1, in accordance with various configurations.

FIG. 4 schematically illustrates a component level view of an example electronic device 400, such as UEs 108 and 110, configured to function within wireless communication network 100. The electronic device 400 may include more or less components depending on the type of electronic device. As illustrated, the electronic device 400 comprises a system memory 402, e.g., computer-readable media, storing application(s) 404. The mobile device also comprises a settings module 406, and an operating system 408. Also, the electronic device 400 includes processor(s) 412, a removable storage 414, a non-removable storage 416, cache 418, transceivers 420, output device(s) 422, and input device(s) 424. In various implementations, system memory 402 is volatile (such as RAM), non-volatile (such as ROM, flash memory, etc.) or some combination of the two. In some implementations, the processor(s) 412 is a central processing unit (CPU), a graphics processing unit (GPU), or both CPU and GPU, or any other sort of processing unit.

The electronic device 400 may also include additional data storage devices (removable and/or non-removable) such as, for example, magnetic disks, optical disks, or tape. Such additional data storage may include removable storage 414 and non-removable storage 416. Additionally, the electronic device 400 includes cache 418.

Non-transitory computer-readable media may include volatile and nonvolatile, removable and non-removable tangible, physical media implemented in technology for storage of information, such as computer readable instructions, data structures, program modules, or other data. System memory 402, removable storage 414, non-removable storage 416 and cache 418 are all examples of non-transitory computer-readable media. Non-transitory computer-readable media include, but are not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, or any other tangible, physical medium which can be used to store the desired information and which can be accessed by the electronic device 400. Any such non-transitory computer-readable media may be part of the electronic device 400. The processor(s) 412 may be configured to execute instructions, which may be stored in the non-transitory computer-readable media or in other computer-readable media accessible to the processor(s) 412.

In some implementations, the transceivers 420 include any sort of transceivers known in the art. For example, the transceivers 420 may include a radio transceiver that performs the function of transmitting and receiving radio frequency communications via an antenna (not shown). Also, or alternatively, the transceivers 420 may include wireless modem(s) to facilitate wireless connectivity with other computing devices. Further, the transceivers 420 may include wired communication components, such as an Ethernet port, for communicating with other networked devices.

In some implementations, the output devices 422 include any sort of output devices known in the art, such as a display (e.g., a liquid crystal display), speakers, a vibrating mechanism, or a tactile feedback mechanism. Output devices 422 also include ports for one or more peripheral devices, such as headphones, peripheral speakers, or a peripheral display.

In various implementations, input devices 424 include any sort of input devices known in the art. For example, input devices 424 may include a camera, a microphone, a keyboard/keypad, or a touch-sensitive display. A keyboard/keypad may be a push button numeric dialing pad (such as on a typical telecommunication device), a multi-key keyboard (such as a conventional QWERTY keyboard), or one or more other types of keys or buttons, and may also include a joystick-like controller and/or designated navigation buttons, or the like. The input devices 424 may be used to enter preferences of a user of the electronic device 400 to define how the user wishes certain calls from third parties to be handled by the wireless communication network, as previously described herein.

Some or all operations of the processes described above can be performed by execution of computer-readable instructions stored on a computer storage medium, as defined below. The term "computer-readable instructions" as used in the description and claims, include routines, applications, application modules, program modules, programs, components, data structures, algorithms, and the like. Computer-readable instructions can be implemented on various system configurations, including single-processor or multi-processor systems, minicomputers, mainframe computers, personal computers, hand-held computing devices, microprocessor-based, programmable consumer electronics, combinations thereof, and the like. Memory 402 is an example of computer storage media.

The computer storage media may include volatile memory (such as random access memory (RAM)) and/or non-volatile memory (such as read-only memory (ROM), flash memory, etc.). The computer storage media may also include additional removable storage and/or non-removable storage including, but not limited to, flash memory, magnetic storage, optical storage, and/or tape storage that may provide non-volatile storage of computer-readable instructions, data structures, program modules, and the like.

A non-transient computer storage medium is an example of computer-readable media. Computer-readable media includes at least two types of computer-readable media, namely computer storage media and communications media. Computer storage media includes volatile and non-volatile, removable and non-removable media implemented in any process or technology for storage of information such as computer-readable instructions, data structures, program modules, or other data. Computer storage media includes, but is not limited to, phase change memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanism. As defined herein, computer storage media do not include communication media.

The computer-readable instructions stored on one or more non-transitory computer storage media that, when executed by one or more processors, may perform operations described above with reference to FIGS. 1-3. Generally, computer-readable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

Figure 5:
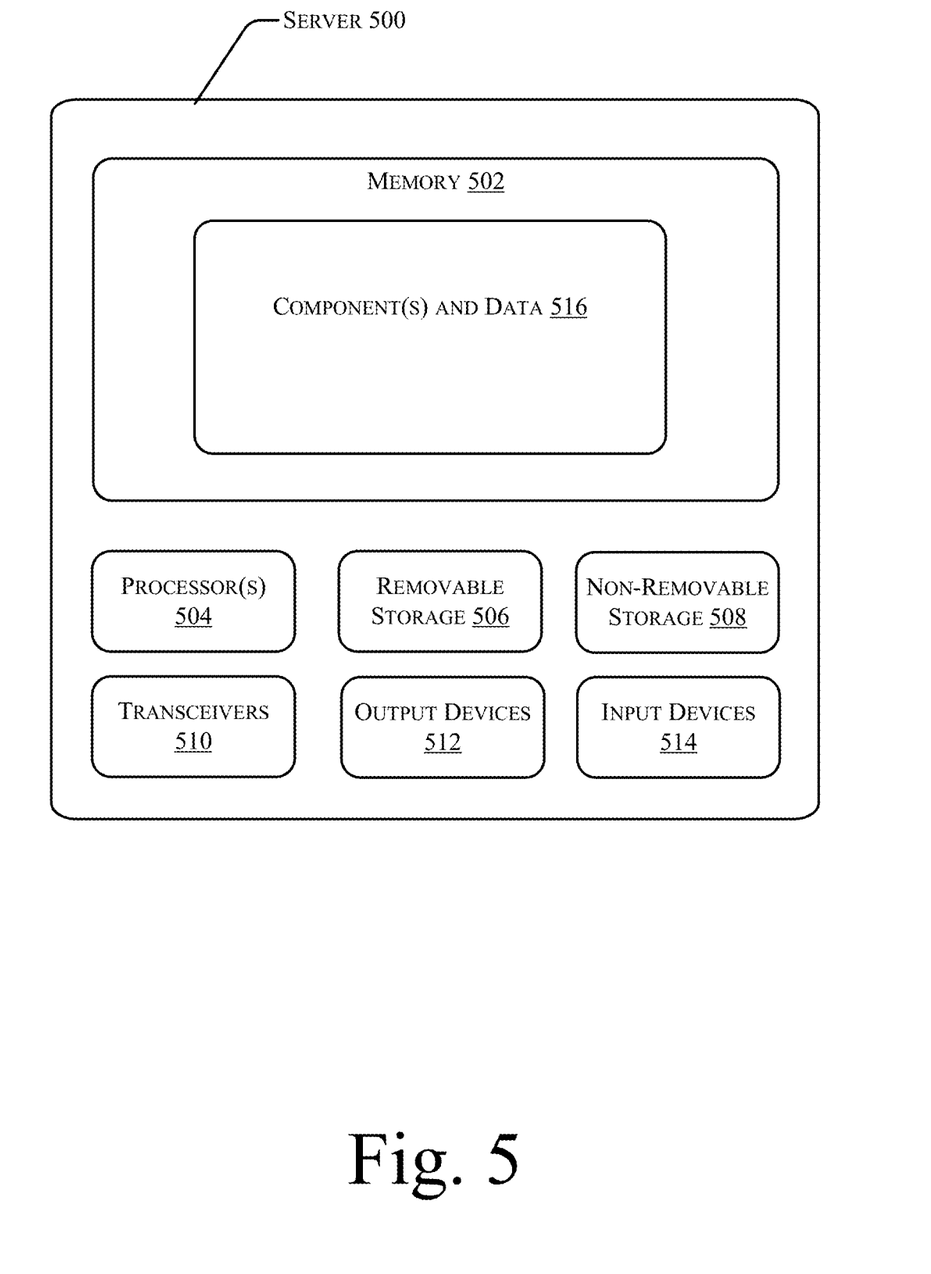
FIG. 5 schematically illustrates a component level view of a server configured for use in the cell of FIGS. 1 and 2 to provide various services of the cell of FIGS. 1 and 2 (and wireless communication of FIG. 1), in accordance with various configurations.

FIG. 5 illustrates a component level view of a server 500 configured for use within a wireless communication network, e.g., wireless communication network 100 in order to provide various services within the wireless communication network, according to the techniques described herein. For example, one or more servers 500 may be configured to operate as an eNB, e.g., the LTE base station 104, while one or more servers 500 may be configured to operate as a gNB, e.g., the NR base station 106. As illustrated, the server 500 comprises a system memory 502 that may store one or more components and/or applications and data 516 for interacting with electronic devices 400, e.g., UEs 108 and 110, or other electronic devices that may be configured as connected devices, as described herein. Also, the server 500 may include processor(s) 504, a removable storage 506, a non-removable storage 508, transceivers 510, output device(s) 512, and input device(s) 514.

In various implementations, system memory 502 is volatile (such as RAM), non-volatile (such as ROM, flash memory, etc.), or some combination of the two. In some implementations, the processor(s) 504 is a Central Processing Unit (CPU), a Graphics Processing Unit (GPU), or both CPU and GPU, or any other sort of processing unit.

The server 500 may also include additional data storage devices (removable and/or non-removable) such as, for example, magnetic disks, optical disks, or tape. Such additional storage is illustrated in FIG. 5 by removable storage 506 and non-removable storage 508. The one or more of the memory 502, the removable storage 506 and/or the non-removable 508 may include module(s) and data 516 (illustrated in the memory 502). The module(s) and data 516 may include instructions executable by, for example, the processor(s) 504.

Non-transitory computer-readable media may include volatile and nonvolatile, removable and non-removable tangible, physical media implemented in technology for storage of information, such as computer readable instructions, data structures, program modules, or other data. System memory 502, removable storage 506 and non-removable storage 508 are all examples of non-transitory computer-readable media. Non-transitory computer-readable media include, but are not limited to, RAM, ROM, EEPROM, flash memory or other memory technology, CD-ROM, Digital Versatile Disks (DVD) or other optical storage, magnetic cassettes, magnetic tape, magnetic disk storage or other magnetic storage devices, or any other tangible, physical medium which can be used to store the desired information and which can be accessed by the server 500. Any such non-transitory computer-readable media may be part of the server 500.

In some implementations, the transceivers 510 include any sort of transceivers known in the art. For example, the transceivers 510 may include wired communication components, such as an Ethernet port, for communicating with other networked devices. Also, or instead of, the transceivers 510 may include wireless modem(s) to facilitate wireless connectivity with other computing devices. Further, the transceivers 510 may include a radio transceiver that performs the function of transmitting and receiving radio frequency communications via an antenna.

In some implementations, the output devices 512 include any sort of output devices known in the art, such as a display (e.g., a liquid crystal display), speakers, a vibrating mechanism, or a tactile feedback mechanism. Output devices 512 also include ports for one or more peripheral devices, such as headphones, peripheral speakers, or a peripheral display.

In various implementations, input devices 514 include any sort of input devices known in the art. For example, input devices 514 may include a camera, a microphone, a keyboard/keypad, a computer mouse, or a touch-sensitive display. A keyboard/keypad may be a push button numeric dialing pad (such as on a typical telecommunication device), a multi-key keyboard (such as a conventional QWERTY keyboard), or one or more other types of keys or buttons, and may also include a joystick-like controller and/or designated navigation buttons, or the like.

Some or all operations of the processes described above can be performed by execution of computer-readable instructions stored on a computer storage medium, as defined below. The term "computer-readable instructions" as used in the description and claims, include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like. Memory 302 and memory 502 are examples of computer storage media.

The computer storage media may include volatile memory (such as random access memory (RAM)) and/or non-volatile memory (such as read-only memory (ROM), flash memory, etc.). The computer storage media may also include additional removable storage and/or non-removable storage including, but not limited to, flash memory, magnetic storage, optical storage, and/or tape storage that may provide non-volatile storage of computer-readable instructions, data structures, program modules, and the like.

A non-transient computer storage medium is an example of computer-readable media. Computer-readable media includes at least two types of computer-readable media, namely computer storage media and communications media. Computer storage media includes volatile and non-volatile, removable and non-removable media implemented in any process or technology for storage of information such as computer-readable instructions, data structures, program modules, or other data. Computer storage media includes, but is not limited to, phase change memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanism. As defined herein, computer storage media do not include communication media.

The computer-readable instructions stored on one or more non-transitory computer storage media that, when executed by one or more processors, may perform operations described above with reference to FIGS. 1-3. Generally, computer-readable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A method comprising:
receiving, at a first node of a wireless communication network and over a first frequency range, first information from a user device in accordance with a first wireless network standard based at least in part on a user device being within a first coverage area of the wireless communication network;
receiving, at a second node of the wireless communication network and over a second frequency range, second information from the user device in accordance with a second wireless network standard based at least in part on the user device being within the first coverage area and the second coverage area;
receiving, at the first node of a wireless communication network and over the second frequency range, third information from the user device in accordance with the first wireless network standard, the third information received during first subframes of a radio frame based at least in part on the user device being within a second coverage area of the wireless communication network; and
receiving, at the second node of the wireless communication network and over the second frequency range, fourth information from the user device in accordance with a second wireless network standard, the second information received during second subframes of the radio frame, the second subframes and the first subframes representing non-overlapping subframes in time based at least in part on the user device being within the second coverage area of the wireless communication network.

2. The method of claim 1, wherein the first subframes comprise even numbered subframes of the radio frame and the second subframes comprise odd numbered subframes of the radio frame.

3. The method of claim 1, wherein the first wireless network standard is Long Term Evolution (LTE) and the second wireless network standard is Fifth Generation New Radio (5G NR).

4. The method of claim 1, further comprising:
transmitting, from the first node of the wireless communication network, fifth information to the user device in accordance with the first wireless network standard during all subframes of the radio frame; and
simultaneously transmitting, from the second node of the wireless communication network, sixth information to the user device in accordance with the second wireless network standard during all subframes of the radio frame.

5. The method of claim 1, further comprising:
transmitting, from the first node of the wireless communication network, fifth information to the user device in accordance with the first wireless network standard during the first subframes of the radio frame; and
transmitting, from the second node of the wireless communication network, sixth information to the user device in accordance with the second wireless network standard during the second subframes of the radio frame.

6. The method of claim 5, wherein transmitting the fifth information to the user device in accordance with the first wireless network standard during the first subframes of the radio frame and the sixth information to the user device in accordance with the second wireless network standard during the second subframes of the radio frame is based at least in part on the user device approaching an edge of the second coverage area.

7. The method of claim 5, wherein the first wireless network standard is Long Term Evolution (LTE) and the second wireless network standard is Fifth Generation New Radio (5G NR).

8. The method of claim 1, wherein the first information and the second information are received during overlapping subframes of the radio frame.

9. A wireless communication network comprising:
a first node configured according to a first wireless network standard operating at least partially within a first frequency band and at least partially within a second frequency band, the first node comprising one or more first processors and a first non-transitory storage medium comprising first instructions stored thereon, the first instructions being executable by the one or more first processors to perform first actions, the first actions comprising receiving first information from a user device in accordance with the first wireless network standard, the first information received via the first frequency band responsive to the user device being in a first coverage area and during first subframes of a radio frame in the second frequency band responsive of the user device being in a second coverage area; and
a second node configured according to a second wireless network standard operating at least partially within the first second frequency band, the second node comprising one or more second processors and a second non-transitory storage medium comprising second instructions stored thereon, the second instructions being executable by the one or more second processors to perform second actions, the second actions comprising receiving second information from the user device in accordance with the second wireless network standard, the second information received during second subframes of a radio frame responsive to the user device being in the second coverage area, the second subframes and the first subframes representing non-overlapping subframes in time.

10. The wireless communication network of claim 9, wherein the first subframes comprise even numbered subframes of the radio frame and the second subframes comprise odd numbered subframes of the radio frame.

11. The wireless communication network of claim 10, wherein the first wireless network standard is Long Term Evolution (LTE) and the second wireless network standard is Fifth Generation New Radio (5G NR).

12. The wireless communication network of claim 9, wherein:
the first actions further comprise transmitting third information to the user device in accordance with the first wireless network standard during all subframes of the radio frame; and
the second actions further comprise simultaneously transmitting fourth information to the user device in accordance with the second wireless network standard during all subframes of the radio frame.

13. The wireless communication network of claim 9, wherein:
the first actions further comprise transmitting third information to the user device in accordance with the first wireless network standard during the first subframes of the radio frame; and
the second actions further comprise transmitting fourth information to the user device in accordance with the second wireless network standard during the second subframes of the radio frame.

14. The wireless communication network of claim 13, wherein the first subframes comprise even numbered subframes of the radio frame and the second set of subframes comprise odd numbered subframes of the radio frame.

15. The wireless communication network of claim 14, wherein the first wireless network standard is Long Term Evolution (LTE) and the second wireless network standard is Fifth Generation New Radio (5G NR).

16. The wireless communication network of claim 13, transmitting the third information to the user device in accordance with the first wireless network standard during the first subframes of the radio frame and the fourth information to the user device in accordance with the second wireless network standard during the second subframes of the radio frame is based at least in part on the user device approaching an edge of the second coverage area.

17. A portable electronic device comprising a non-transitory storage medium comprising instructions stored thereon, the instructions being executable by one or more processors to perform actions, the actions comprising:
transmitting, based at least in part on the portable electronic device being in a first coverage region, to a first node of a wireless communication network first information in accordance with a first wireless network standard operating at least partially within a first frequency band, the first information transmitted during first subframes of a radio frame;
transmitting, based at least in part on the portable electronic device being in a second coverage region, to the first node of the wireless communication network second information in accordance with the first wireless network standard operating at least partially within a second frequency band, the second information transmitted during the first subframes of the radio frame; and transmitting, based at least in part on the portable electronic device being in the first coverage region or the second coverage region, to a second node of the wireless communication network third information in accordance with a second wireless network standard operating at least partially within the first frequency band, the third information transmitted during second subframes of the radio frame, the second subframes and the first subframes representing non-overlapping subframes in time.

18. The portable electronic device of claim 17, wherein the actions further comprise:

receiving, from the first node of the wireless communication network, third information in accordance with the first wireless network standard during all subframes of the radio frame; and simultaneously receiving, from the second node of the wireless communication network, fourth information in accordance with the second wireless network standard during all subframes of the radio frame.

19. The portable electronic device of claim 17, wherein the actions further comprise:

receiving, from the first node of the wireless communication network, third information in accordance with the first wireless network standard during the first subframes of the radio frame; and receiving, from the second node of the wireless communication network, fourth information in accordance with the second wireless network standard during the second subframes of the radio frame.

20. The portable electronic device of claim 19, wherein receiving the third information in accordance with the first wireless network standard during the first subframes of the radio frame and the fourth information in accordance with the second wireless network standard during the second subframes of the radio frame is based at least in part on the portable electronic device being in the first coverage region.

* * * * *